United States Patent
Utsumi et al.

(10) Patent No.: US 6,879,911 B1
(45) Date of Patent: Apr. 12, 2005

(54) NAVIGATION DEVICE

(75) Inventors: Koichiro Utsumi, Hyogo (JP); Mitsuru Yamada, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 6 days.

(21) Appl. No.: 10/030,912

(22) PCT Filed: Jun. 9, 2000

(86) PCT No.: PCT/JP00/03785

§ 371 (c)(1),
(2), (4) Date: Jan. 14, 2002

(87) PCT Pub. No.: WO01/94887

PCT Pub. Date: Dec. 13, 2001

(51) Int. Cl.[7] .......................... G01C 21/00; G01C 21/34
(52) U.S. Cl. .................... 701/209; 701/210; 340/990
(58) Field of Search ................... 701/209, 210, 701/200, 201, 202, 117; 340/990, 995.1, 995.13; 342/454

(56) References Cited

U.S. PATENT DOCUMENTS

| | | | | |
|---|---|---|---|---|
| 5,369,588 A | * | 11/1994 | Hayami et al. | 364/449 |
| 5,371,678 A | * | 12/1994 | Nomura | 364/444 |
| 5,675,492 A | | 10/1997 | Tsuyuki | 701/210 |
| 5,842,146 A | * | 11/1998 | Shishido | 701/210 |
| 5,862,509 A | * | 1/1999 | Desai et al. | 701/209 |
| 5,911,773 A | * | 6/1999 | Mutsuga et al. | 701/200 |
| 6,101,443 A | * | 8/2000 | Kato et al. | 701/210 |
| 6,192,314 B1 | * | 2/2001 | Khavakh et al. | 701/209 |
| 6,317,685 B1 | * | 11/2001 | Kozak et al. | 701/210 |
| 6,470,266 B1 | * | 10/2002 | Ito et al. | 701/209 |

FOREIGN PATENT DOCUMENTS

| | | |
|---|---|---|
| JP | 4-188181 | 7/1992 |
| JP | 7-134795 | 5/1995 |
| JP | 8-77491 | 3/1996 |
| JP | 9-44791 | 2/1997 |
| JP | 9-61179 | 3/1997 |
| JP | 10-141975 | 5/1998 |
| JP | 10-300495 | 11/1998 |
| WO | WO 99/64823 A1 | 12/1999 |

* cited by examiner

Primary Examiner—Tan Q. Nguyen
Assistant Examiner—Dalena Tran
(74) Attorney, Agent, or Firm—Birch, Stewart, Kolasch & Birch, LLP

(57) ABSTRACT

A navigation device of the present invention searches a route to a destination referring to map data containing time restriction information with respect to roads.

14 Claims, 4 Drawing Sheets

NAVIGATION DEVICE

This application is the national phase under 35 U.S.C. § 371 of PCT International Application No. PCT/JP00/03785 which has an International filing date of Jun. 9, 2000, which designated the United States of America.

TECHNICAL FIELD

The present invention relates to a navigation device which searches a route to a destination taking time restriction information on road into account.

BACKGROUND ART

When a destination is set, a conventional navigation device searches a route to the destination referring to map data and guides a user to arrive at the destination.

However, time restrictions on the road (traffic restrictions which vary travel time on the route) are not taken into account when searching the route to the destination. Therefore, it is sometimes the case for example that a search result consists of travel on a one-way road in a direction contrary to the permitted direction.

This situation will result in display of a route along which travel is not actually possible.

Since the conventional navigation device is constituted as above, although it is possible to search a route to a destination, the problem arises that a route along which travel is not actually possible is displayed since time restrictions on roads are not taken into account.

The present invention is proposed to solve the above problems and has the object of providing a navigation device capable of displaying route along which travel is actually possible.

DISCLOSURE OF THE INVENTION

A navigation device according to the present invention is adapted to search a route to a destination referring to map data including time restriction information with respect to roads.

In this manner, the advantageous effect is obtained that it is possible to display a route along which travel is actually possible without displaying a route along which travel is not permitted as a result of time restrictions.

According to the present invention, the navigation device may be provided with a restriction information reception means which receives additions, modifications or deletions to the time restriction information.

In this manner, the advantageous effect is obtained that it is possible to revise the time restriction information when the time restriction information contained in the map data differs from actual time restrictions as a result of map data being out of date.

According to the present invention, the navigation device may be adapted to re-search the route to the destination taking the time restriction information into account when an addition, modification or deletion relating to the time restriction information is received by the restriction information reception means.

In this manner, the advantageous effect is obtained that it is possible to display a route along which permitted travel is confirmed.

According to the present invention, when a road with time restrictions is contained in an optimal route to the destination, a navigation device may output the route to a display means, and at the same time search an another route which avoids the road with the time restrictions and output the another route to the dispaly means.

In this manner, the advantageous effect is obtained that it is possible to discern a route avoiding roads with time restrictions separately from route containing the roads with time restrictions.

According to the present invention, the navigation device may be adapted to display each route distinguishably when a plurality of routes are output from the route searching means.

In this manner, the advantageous effect is obtained that it is possible to distinguish in a simple manner between the roads with time restrictions and the bypass roads.

According to the present invention, the navigation device may be provided with a selection means which selects a route to be actually traveled, when a plurality of routes are output from the route searching means.

In this manner, the advantageous effect is obtained that it is possible for a user to select a route as desired.

According to the present invention, the navigation device may be adapted to display the details of time restrictions before a user reaches branching points of the by-pass road and the road with time restrictions.

In this manner, the advantageous effect is obtained that it is possible for a user on the basis of details of the time restrictions to select a road which will actually be traveled.

According to the present invention, the navigation device may be adapted to display the details of time restrictions when roads with the time restrictions is contained in the route searched by the route searching means.

In this manner, the advantageous effect is obtained that it is possible to consider the details of time restrictions when determining whether or not to use the route searched by the route searching means.

According to the present invention, the navigation device may be provided with a setting means which sets whether or not to avoid travelling on roads with time restrictions.

In this manner, the advantageous effect is obtained that it is possible to avoid travelling on the roads with time restrictions by user's intention.

According to the present invention, the navigation device may be adapted to re-search a route avoiding roads with time restrictions when a by-pass setting has been performed in order to avoid travelling on the roads with time restrictions.

In this manner, the advantageous effect is obtained that it is possible to display a route avoiding the roads with time restrictions.

BEST MODE FOR CARRYING OUT THE INVENTION

In order to describe the invention in greater detail, the best mode for carrying out the invention will be outlined below with reference to the accompanying figures.

Embodiment 1

Figure 1:
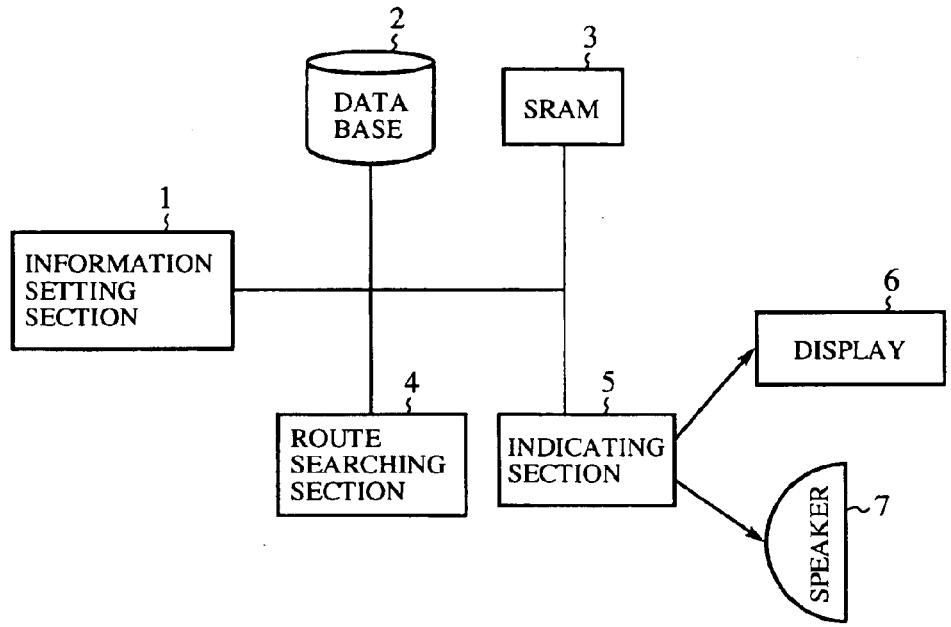
FIG. 1 shows a navigation device according to a first embodiment of the present invention.

FIG. 1 shows a navigation device according to a first embodiment of the present invention. In the figure, reference numeral 1 denotes an information setting section restriction information reception means) which sets a destination and which receives additions, modifications or deletions to time restriction information. 2 is a database constituted by a storage medium such as a CD-ROM, DVD-ROM or memory card which stores map data containing the time restriction information with respect to roads. 3 is a SRAM (a rewritable storage medium other than SRAM may also be used) which stores the time restriction information received by the information setting section 1. The storage means is constituted by the database 2 and the SRAM 3.

4 is a route searching section (route searching means) which searches a route to a destination referring to the map data and the time restriction information. 5 is an indicating section which displays the route searched by the route searching section 4 on a display 6 and which outputs guiding information related to the route to a speaker 7. 6 is a display and 7 is a speaker. The display means is constituted by the indicating section 5, the display 6 and the speaker 7.

Figure 2:
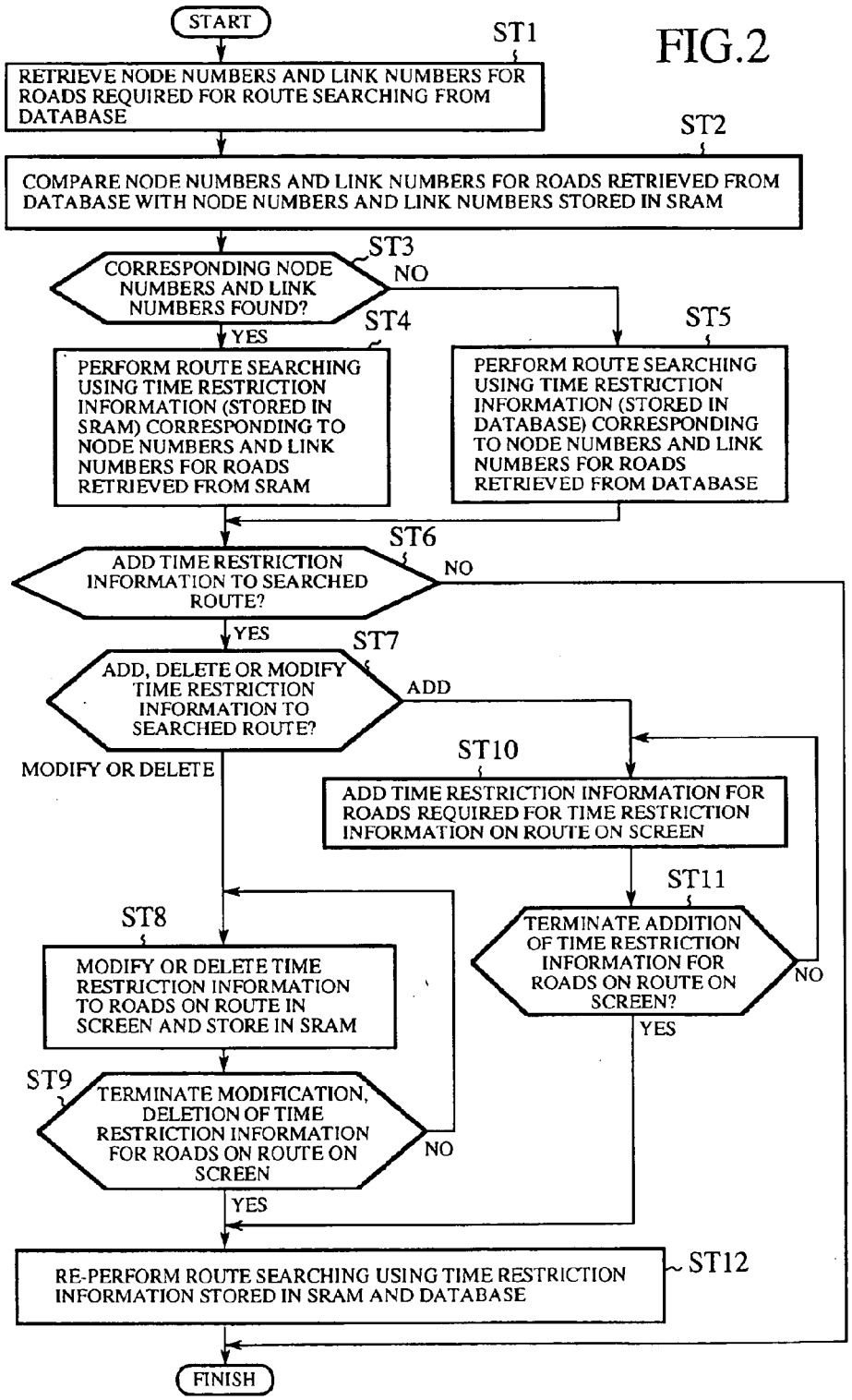
FIG. 2 is a flowchart showing a process performed by the navigation device according to the first embodiment of the present invention.

FIG. 2 is a flowchart showing a process performed by the navigation device according to the first embodiment of the present invention.

The operation of the navigation device according to the first embodiment will be described below.

Firstly, when a user sets a destination using the information setting section 1, the route searching section 4 retrieves link numbers and node numbers of the roads required in the route searching from the database 2 (step ST1).

When the link numbers and the node numbers of the roads required in the route search are retrieved from the database 2, the route searching section 4 performs a comparison with link numbers and node numbers of the roads stored in the SRAM 3 (step ST2). Time restriction information previously set by the user are stored in the SRAM 3.

When the corresponding node numbers and link numbers are found as a result of the comparison (step ST3), the route searching section 4 retrieves the time restriction information corresponding to those node numbers and link numbers from the SRAM 3 (when node numbers or the like not corresponding to those stored in the SRAM 3 are included in the node numbers retrieved from the database 2, time restriction information corresponding to those node numbers is retrieved from the database 2), and searches a route to a destination taking the time restriction information into account (step ST4).

On the other hand, when the corresponding node numbers and link numbers are not found as a result of the comparison (step ST3), the route searching section 4 retrieves the time restriction information corresponding to those node numbers and link numbers from the database 2. Thereafter, a route to a destination is searched taking the time restriction information into account (step ST5).

The route to the destination is displayed on the display 6 by the indicating section 5. Since this route is searched taking the time restriction information into account, display of routes comprising travel in an impermissible direction along one-way roads is avoided as long as the time restriction information is most up-to date.

In this manner, the route to the destination is displayed on the display 6. However, it is sometimes the case that time restrictions on roads vary over time. For example, a road on which two-way travel had been previously permitted may be under one-way traffic restrictions for a fixed period of time.

In order to deal with this situation, after the indicating section 5 displays a route to a destination on a display 6, the route searching section 4 executes a process of inquiring whether the user will perform addition, modification or deletion of the time restriction information with respect to roads on the route. That is to say, the route searching section 4 performs display of an enquiry message to the user on the display 6 through the indicating section 5.

The time restriction information to be added, modified or deleted may comprise "no entry", "one-way traffic" or "pedestrians only" (no vehicle entry).

When the addition or the like to the time restriction information is not performed by the user using the information setting section 1, the route searching section 4 terminates the searching process of a route (step ST6). On the other hand, when the information setting section 1 receives an addition, modification or deletion on the time restriction information, a process is executed in order to store the new time restriction information in the SRAM 3.

That is to say, when a user selects a modification or deletion of the time restriction information, the names of roads with the time restriction information and the details of restrictions are displayed in order of proximity to the departure point. When a user uses the information setting section 1 to input time restriction information (time restriction information after modification) (it is noted that a day of the week may be input as required), the modified time restriction information is stored in the SRAM 3, on the other hand, when a user uses the information setting section 1 to delete time restriction information, the time restriction information is deleted from the SRAM 3 or the database 2 (step ST7 to ST9).

When the database 2 is constituted by a read-only storage medium such as a CD-ROM, the deletion or modification of data in the database 2 can not be directly performed. However, in this case, the data deleted or modified is stored in the SRAM 3, and when the data in the database 2 is accessed, the corresponding data in the SRAM 3 is read out. Thus, also in such a case, the deletion or modification of data is possible by using the data read out from the SRAM 3.

When a user selects an addition of the time restriction information, the names of roads are displayed in order of proximity to the departure point. Thereafter, when the user inputs time restriction information (new time restriction information) using the information setting section 1 (input of the day of the week may be performed as required), the new time restriction information is stored in the SRAM 3 (steps ST7, ST10, ST11).

In the above manner, when an addition, modification or deletion to the time restriction information is received by the information setting section 1, the route searching means 4 re-searches a route to the destination taking the newest time restriction information into account (step ST12). Thereafter the indicating section 5 displays the route to the destination on the display 6.

As described above, according to the first embodiment, a route to the destination is searched referring to map data containing time restriction information on roads. Thus, the advantageous effect is obtained that it is possible to display a route along which travel is actually possible without displaying routes along which travel is not permitted as a result of time restrictions.

Since the addition, modification or deletion of the time restriction information can be input, the advantageous effect is obtained that it is possible to revise the time restriction information when the time restriction information contained in the map data differs from the actual time restrictions as a result of map data becoming out-of-date.

Embodiment 2

In the first embodiment above, a process is described of searching a route to a destination by referring to map data including time restriction information on roads. However, when a road with time restrictions is contained in an optimal route to the destination, the route containing the road with time restrictions may be displayed on the display 6. At the same time, a route avoiding the road with time restrictions may be searched and displayed on the display 6.

The operation of the navigation device according to the second embodiment will be described below.

Figure 3:
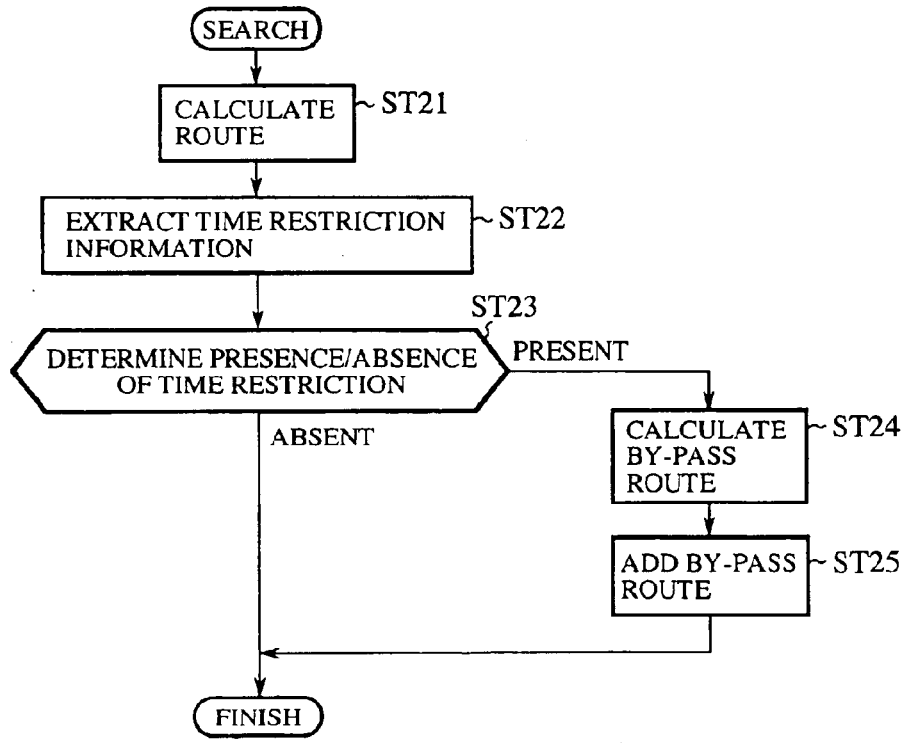
FIG. 3 is a flowchart showing a process performed by a navigation device according to a second embodiment of the present invention.

FIG. 3 is a flowchart showing a process performed by the navigation device according to the second embodiment of the present invention.

Firstly, when a user uses the information setting section 1 to set a destination, the route searching section 4 searches an optimal route to the destination referring to the map data (step ST21). Thereafter, the indicating section 5 displays the route to the destination on the display 6.

When searching a route to a destination, the route searching section 4 determines whether or not there are roads with time restrictions on the route to the destination by referring to the time restriction information stored in the database 2 and the SRAM 3. When there are roads with the time restrictions, the time restriction information for those roads is extracted (step ST22).

When the time restriction information for roads is not extracted, the route searching section 4 terminates the route searching process (step ST23). On the other hand, when the time restriction information for roads is extracted, a route avoiding or by-passing those roads is searched referring to the time restriction information (step S24).

If a by-pass route is searched, the route searching section 4 displays the by-pass route on the display 6. That is to say, both the by-pass route and the previously searched route are displayed on the display 6 (step ST25). Furthermore, each route is separately displayed by using different colors in order to display each route.

Figure 4:
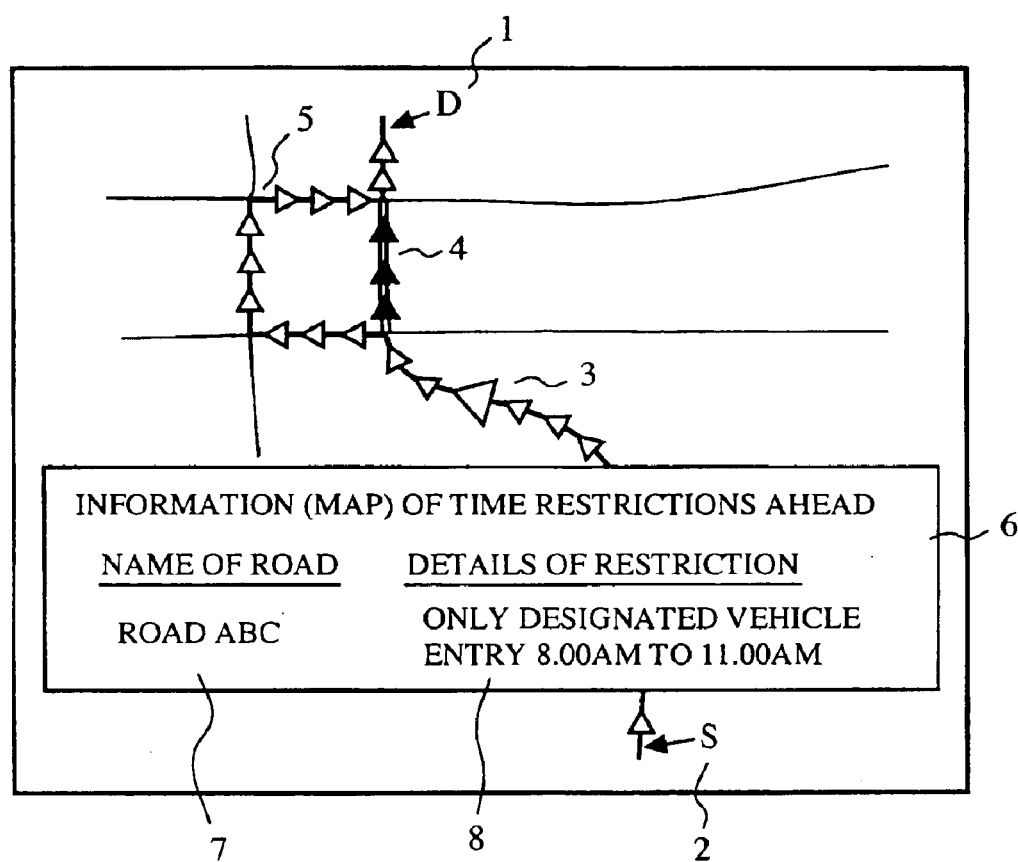
FIG. 4 shows an example of a screen on a display.

FIG. 4 shows an example of a screen on the display 6.

Along a route from a departure point ② to a destination ①, there are a road ④ with time restrictions, a by-pass road ⑤ avoiding the road ④ with time restrictions and a vehicle position ③. Before reaching a branching point of the road ④ with time restrictions and the by-pass road ⑤, details of restrictions (telop ⑥) of the road ④ with time restrictions are indecated to the user.

Road names ⑦ of the road ④ with time restrictions extracted from the map data and the details of restrictions ⑧ are shown in the telop ⑥. The user employs the information setting section 1, comprising a selection means, in order to select either the road ④ with time restrictions or the by-pass road ⑤ on the basis of a comparison with the actual road restrictions, thereby to determine the route to be traveled.

Although a telop is used to display an information on the roads ④ with time restrictions, the same advantageous effect is obtained by using another method allowing transmission of the same information.

With respect to the display period of information related to roads ④ with time restrictions, the same advantageous effect is obtained by allowing display as required on the basis of a user operation before reaching a branching point of the roads ④ with time restrictions and the by-pass road ⑤.

Embodiment 3

In the first embodiment above, a process is described of searching a route to a destination by referring to map data containing road time restriction information. However, when roads with time restrictions are contained in the searched route, the process may be adapted so that the details of time restrictions are displayed and a setting of whether or not to avoid travelling the roads with time restrictions is effected.

The operation of the navigation device according to the third embodiment will be described below.

Figures 5, 6:
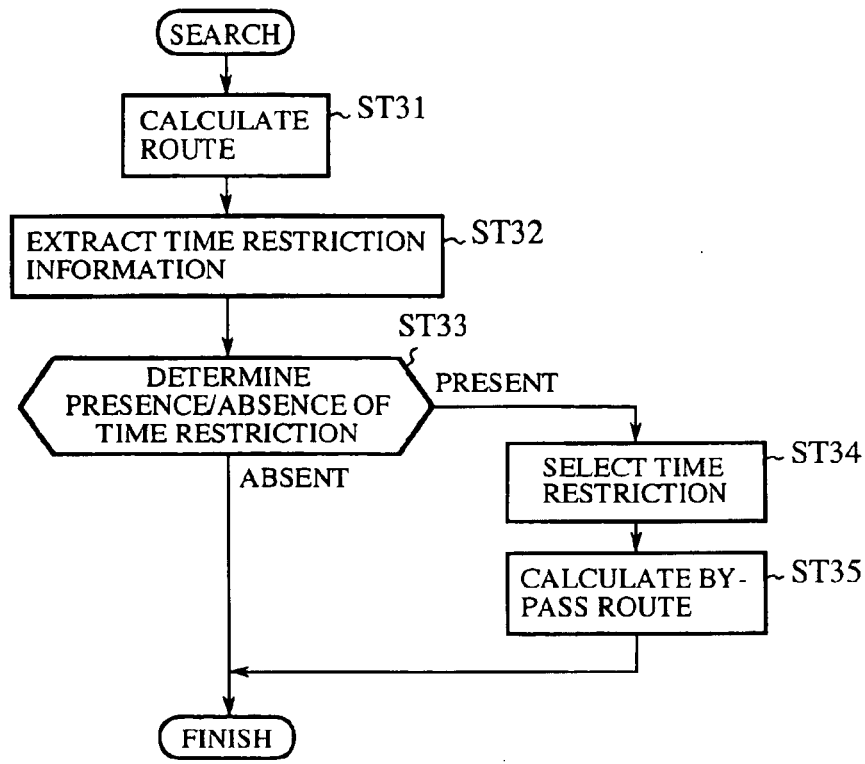
FIG. 5 is a flowchart showing a process performed by a navigation device according to a third embodiment of the present invention.
FIG. 6 shows an example of a screen indicating a time restriction list.

FIG. 5 is a flowchart showing a process performed by the navigation device according to the third embodiment of the present invention.

A time restriction on a road can not be said to result in good travelling conditions on that road due to relaxation of traffic congestion or other specific local conditions.

Thus, the navigation device of the third embodiment is adapted to allow a user to decide whether to avoid travelling on roads with time restrictions.

More precisely, when the user set a destination using the information setting section 1, the route searching section 4 searches an optimal route to the destination referring to map data (step ST31) and the indicating section 5 displays the route to the destination on the display 6.

When searching a route to the destination, the route searching section 4 determines whether or not there are roads with time restrictions on the route to the destination by referring to time restriction information stored in the database 2 and the SRAM 3. When there are roads with time restrictions, the route searching section 4 extracts the time restriction information on the roads (step ST32).

When road time restriction information is not extracted, the route searching section 4 terminates the route searching process (step ST33). On the other hand, when road time restriction information is extracted, a time restriction list for setting a by-pass for travel on roads with time restrictions is displayed on the display 6 (refer to FIG. 6).

Then, the user uses the information setting section 1, comprising a setting means, to set whether or not to avoid travelling on the roads with time restrictions (step ST34). When a by-pass is set, the route searching section 4 re-searches a route to the destination in consideration of the set details (step ST35) and the indicating section 5 displays the route to the destination on the display 6.

FIG. 6 shows an example of a screen showing a time restriction list.

Names A of roads with time restriction information and the details B of the restriction are displayed in order on the route from the departure point to the destination. The user performs a setting to a selection C on the screen on each road name in order to effect (O:by-pass) or disable (X:no by-pass) the restrictions.

Although selections are described as being displayed in order along the route in order to display each name in the aforesaid description, the same advantageous effect is obtained by displaying in order with respect to the type of restrictions such as large vehicle restrictions for example.

Furthermore, the same advantageous effect is obtained by making a selection to effect/disable each type of restriction or make a single selection to effect/disable all restrictions.

INDUSTRIAL APPLICABILITY

As described above, a navigation device according to the present invention is adapted to re-search a route avoiding roads with time restrictions when the roads with time restrictions are present in a route to a destination.

What is claimed is:

1. A navigation device, comprising:

storage means for storing map data containing road time restriction information;

route searching means for searching a route to a destination referring to the map data stored in the storage means, wherein when a road with time restriction is present in an optimal route to the destination, the route searching means outputs the optimal route to the display means, and at the same time searches a route by-passing the road with time restrictions and outputs the route by-passing the road with time restrictions to display means;

the display means for displaying the route or routes searched by the route searching means; and selection means which allows a user to select either the optimal route or the route by-passing the road with time restrictions.

2. The navigation device according to claim 1, wherein the display means displays each route separately when a plurality of routes are output from the route searching means.

3. The navigation device according to claim 1, wherein the display means displays details of the time restriction before a user reaches a branching point of the road with time restrictions and the by-pass road.

4. A navigation device, comprising:

storage means for storing map data containing road time restriction information;

route searching means for searching a route to a destination referring to the map data stored in the storage means;

display means for displaying the route searched by the route searching means, wherein the display means displays details of the time restriction when a road with time restrictions is present in the route searched by the route searching means; and setting means allowing a user to determine whether or not to avoid traveling on roads with time restrictions.

5. The navigation device according to claim 4, wherein when the user indicates to avoid traveling on the road with time restrictions via the setting means, the route searching means re-searches a route by-passing the road with time restrictions.

6. A navigation apparatus, comprising:

a route searching section configured to search for a plurality of routes from a starting point to a destination;

a display configured to display the plurality of routes searched by the route searching section; and an interactive selector configured to allow a user to select a particular route from the plurality of routes, wherein the plurality of routes includes an optimal route and at least one by-pass route, wherein the route searching selection is configured to search for the at least one by-pass route if the optimal route includes roads with time restrictions.

7. The apparatus of claim 6, further comprising:

a database configured to store map data information including time restriction information with respect to roads, wherein the interactive selector is further configured to allow the user to enter, modify, and/or delete time restriction information with respect to roads, and wherein the route searching section is configured to use both the database information and the user-entered information.

8. The apparatus of claim 7, wherein in case where the time restriction information for a road exists in both the database information and the user-entered information, the route searching section is configured to use the user-entered information.

9. An interactive route selection apparatus for navigation, comprising:

an interactive selector configured to receive from a user start and destination information and time restriction information with respect to roads;

a database configured to store map data information including time restriction information with respect to roads;

a route searching section configured to search for a route from the start to destination based on both the user-entered information and the database information; and a display configured to display the route searched by the route searching section, wherein after the route is displayed on the display, the interactive selector allows the user to add, delete, and/or modify time restriction information of roads along the route, the route searching section searches for an updated route from the start to destination based on both the updated user-entered information, and the display displays the updated route searched by the route searching section.

10. The apparatus of claim 9, wherein the interactive selector, the route searching section, and the display cooperatively operates to repeatedly update and display the updated route from the start to destination until the user indicates that no more updates to the time restriction are necessary.

11. A navigation apparatus, comprising the interactive route selection apparatus according to claim 10, wherein the route searching section is configured to search for a plurality of routes from the starting point to a destination;

the display is configured to display the plurality of routes searched by the route searching section; and the interactive selector is configured to allow the user to select a particular route from the plurality of routes.

12. The apparatus of claim 11, wherein the plurality of routes includes an optimal route and at least one by-pass route, wherein the route searching selection is configured to search for the at least one by-pass route if the optimal route includes roads with time restrictions.

13. A navigation apparatus, comprising the interactive route selection apparatus according to claim 10, wherein the display is configured to display details of the time restriction when a road with time restrictions is present in the route searched by the route searching means, and the interactive selector is configured to allow the user to determine whether or not to avoid traveling on roads with time restrictions.

14. The navigation apparatus of claim 13, wherein when the user indicates to avoid traveling on the road with time restrictions via the interactive selector, the route searching section for a route by-passing the road with time restrictions.

* * * * *